Oct. 4, 1949. A. G. STIMSON 2,483,945
VEST POCKET EXPOSURE METER
Original Filed Oct. 19, 1946 2 Sheets-Sheet 2
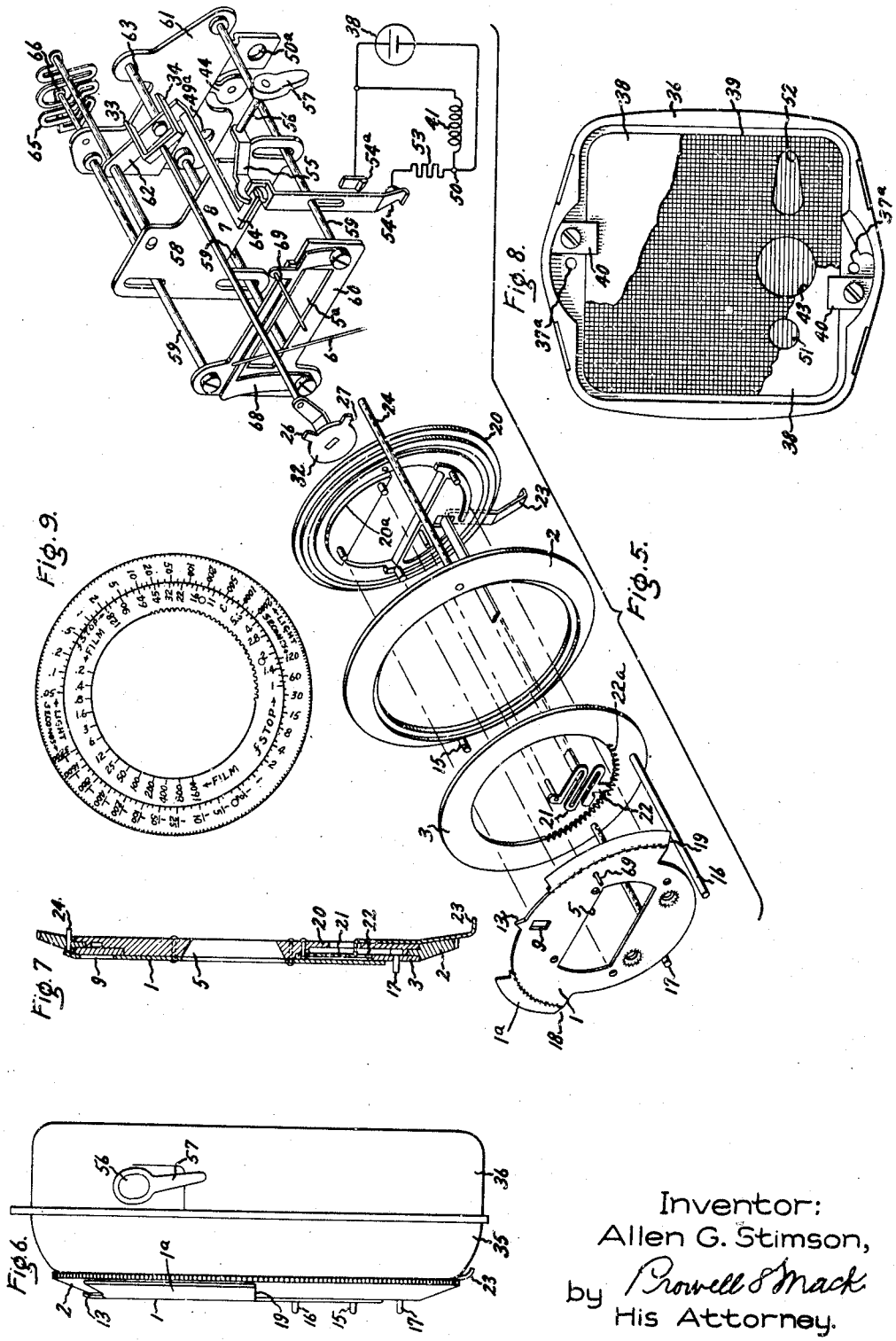
Inventor:
Allen G. Stimson,
by Prowell & Mack
His Attorney.

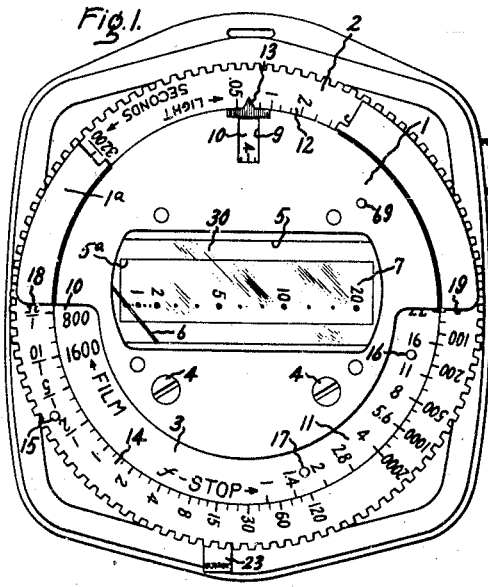

Patented Oct. 4, 1949

2,483,945

UNITED STATES PATENT OFFICE 2,483,945

VEST POCKET EXPOSURE METER

Allen G. Stimson, Lynnfield, Mass., assignor to General Electric Company, a corporation of New York Original application October 19, 1946, Serial No. 704,352. Divided and this application August 29, 1947, Serial No. 771,348

2 Claims. (Cl. 235—64.7)

My invention relates to a combined exposure meter and calculator and to improvement features thereof and is a division of my application Serial Number 704,352 filed October 19, 1946, now Patent 2,471,171 of May 24, 1949. One object of the invention is to provide an accurate and reliable device of the class described, of such compact structure that it may be carried in the vest pocket. Another object is to provide a device that permits the use of interchangeable calculators on the meter. Another object is to provide a meter with means for changing its sensitivity and scale calibration, thus facilitating its use over a wide range of light variations with high accuracy. Another object of the invention is to provide an interconnection between calibrating changing device of the meter and the movable light value scale of the calculator to the end that the value to be used on the calculator light scale will always be measured and read with facility and high accuracy on the meter.

Another object of my invention is to provide a combination light meter and calculator of the general size and shape of a large size pocket watch in which the light value measurement and all correlating scales of the calculator appear on the front of the device, so that all may be seen the same time in easy reading relationship, the light value measurement being surrounded and framed by the calculator scales.

Another object of my invention is the provision of means for preserving the light value meter reading, thus enabling the use of the instrument for light value measurements without the necessity of looking at the scale at the instant of measurement and remembering the reading.

The features of my invention which are novel and patentable will be pointed out in the claims appended hereto. For a better understanding of my invention, reference is made in the following description to the accompanying drawing in which Fig. 1 represents a face view of my exposure meter and calculator; Fig. 2 is a similar view with the calculator removed and exposing a portion of the driving mechanism between the calculator and meter scale changing mechanism; Fig. 3 is a face view of the meter with the cover section of its casing removed, and with the scale and sensitivity changing mechanism in position for maximum sensitivity and low light values; Fig. 4 is a similar view to that of Fig. 3, except with the parts in position for minimum sensitivity and high light values; Fig. 5 is a schematic axially exploded view of the meter scale changing mechanism and associated parts; Fig. 6 is a side view of the complete instrument; Fig. 7 is a sectional view through the calculator; Fig. 8 is an interior view of the back section of the casing with part of the instrument and light cell broken away and showing the rear transparent closure window through which the light cell is exposed; and Fig. 9 illustrates the complete scales of the calculator which are partially hidden in Fig. 1.

The apparatus to be described comprises a combination light meter and calculator for obtaining correct photographic exposure information. There are features of the meter and calculator and their combination which are believed to be novel and patentable.

Fig. 1 is a front view and Fig. 6 is a side view of the external appearance of the apparatus. The over-all width of the instrument as built is slightly less than 2½ inches and its total thickness is slightly greater than one inch. Its shape is approximately that of a pocket watch. It may, therefore, be carried in a vest pocket without inconvenience. The calculator of the instrument, the main parts of which comprise a stationary masking plate 1, a movable outer calculator ring 2 and a movable inner calculator ring 3 (Figs. 1, 5 and 7), is mounted on the front of the instrument and removably held in place by screws 4. These calculator parts have an elongated opening 5 extending through and across their central portions through which the light meter pointer 6 and its interchangeable scales 7 and 8 may be viewed for the purpose of light value measurements. The stationary masking plate 1 of the calculator also contains an opening at 9 to expose the selected number on a film speed scale 10 reading from ".2" to "1600" and marked about one-half of the periphery of the inner adjustable calculator ring 3. A lens diaphragm f-stop scale 11 reading from "1" to "128" is marked on a remaining sector of ring 3. The outer adjustable calculator ring has a light value scale 12 marked about slightly less than half of its periphery reading from ".05" to "2000." This scale cooperates with the film speed indication exposed in window 9 in the use of the calculator, and the masking plate has a stationary index tab 13 opposite window 9 indicating on scale 12. The plate 1 has sector rim extensions which mask the upper part of scale 12 except over a selected limit range on either side of index 13. This arrangement is intended to expose only that range of light values which are significant and corresponds to the brightness range which can be usefully recorded by photography with ordinary film of the film speed indicated at 9. Flanking the upper rim of mask plate 1 and extending on either side of index 13 is a short section of a color contrasting with the mask plate 1 which marks the allowable brightness range for color film for which the film speed would be indicated at 9. This colored section is shown in Fig. 1 just above the opening 9.

The outer ring 2 also carries a time scale 14 about the rim opposite to scale 12 graduated from "1/3200" to "120" seconds, which scale cooperates with the stop scale 11 to indicate the combinations of shutter speed and relative apertures of the lens that may be used for a given film speed and light value.

The outer ring 2 contains a short upstanding pin 15 near the "½"-second graduation and ring 3 contains two such pins 16 and 17 near the "2" and "16" graduations thereon. These pins are used to assist in turning the rings and to limit their movements to the useful ranges by acting as stops against the lower edges of the extended sectors of masking plate 1 at points 18 and 19. These extended sectors have a rim section 1a bent toward the beveled ring 2 and retain both the outer and inner rings 2 and 3 in place as best shown in Figs. 5 and 6. Masking plate 1 is riveted to a calculator base plate 20 which has hub sectors 20a (see Fig. 5) on which the inner periphery of inner ring 3 rides. Base plate 20 contains a recess in its upper surface below the window opening 5 in which a spring pressed detent is provided and pinned to plate 20 for holding the ring 3 from turning except when the detent is released. The spring portion 21, detent portion 22, and releasing handle 23 of this detent are made in one piece (see Fig. 5). The detent portion 22 engages with teeth 22a cut into the inner periphery of ring 3 over the range of movement of the latter past the detent. The handle portion 23 of the spring detent unit is bent down and out through an opening cut in the bottom of base plate 20 where it is accessible to be pressed radially inwardly by the thumb or finger of the operator. Such pressure pushes the detent 22 out of a depression in ring 3 and allows the latter to be turned. The tooth spacing in ring 3 corresponds to the smaller graduation mark spacing of the film speed scale on ring 3 such that movement of ring 3 one detent notch moves it one film speed scale division. The outer ring 2 has upper and lower circular recesses cut in its inner periphery as shown in Fig. 7; the upper recess forms a seat for the inner ring 3 and the lower recess rides on the outer periphery of base plate 20. The masking plate 1 and base plate 20 are riveted together with the rings 2 and 3 between them. The outer ring 2 has a knurled outer periphery to facilitate easy turning. As thus far described the calculator may be removed from the instrument and used as such with any light meter, and another calculator mechanically similar but with different scale markings substituted in its place. However, for use on the light meter instrument to be described, the outer ring 2 has a pin 24 projecting from its back side for cooperation with a mechanism for changing the light measurement range of the meter as will be explained in connection with Fig. 5. This pin 24 rides in a circular groove 25 cut in the upper wall 29 of the meter (see Fig. 2) and engages with one or the other of arms 26 and 27 of the mechanism just referred to for the purpose of operating the sensitivity and scale changing mechanism of the light meter by turning of ring 2 of the calculator and requiring the proper light measurement range to be used for calculator settings when using high and low light values.

The slot at 28, Fig. 2, in the front wall of the meter casing is to accommodate the detent handle 23, and allow the calculator unit to be mounted closely to such front wall, thus keeping the total thickness within desired limits. The front wall of the meter casing contains a transparent window 30 in line with the window openings in the calculator. The front wall 29 is recessed at 31 to about the depth of groove 25 to accommodate a rotary member 32 with which the arms 26 and 27 are integral. The member 32 has a bearing through the front wall 29 of the meter casing, and its rear side, within the meter casing, has driving arms 33 and 34 with their extremities bent to the rear. The member 32 may be made up of a pair of flat metal parts resting against the front and rear sides of the wall 19 and riveted together through a circular opening 35 in the wall so that it is rotatively mounted in the wall for the purpose of transmitting limited rotary motion therethrough for the purpose of changing the sensitivity and scale of the light measuring instrument by turning the light scale of the calculator. It is to be observed that in Fig. 5 certain parts are shown greatly extended in the axial direction whereas actually the total length of the device 32, 33, 34 is less than the diameter of portion 32 thereof.

The meter casing comprises the front cover wall part 29 already mentioned and a rear portion 36. These parts have integral side walls which extend toward each other and resemble a pair of generally rectangular shallow cups which when placed mouth to mouth form the meter casing. These parts are held together by a pair of screws 37 which are threaded into holes 37a in the rear part of the casing (see Figs. 2 and 3). When the screws are removed, the casing may be opened. Fig. 2 shows the casing closed, and in Figs. 3 and 4 the front section has been removed. The rear wall of the casing contains a large glass window through which a flat light cell 38 placed in the bottom of the casing may be exposed to light for the purpose of taking a brightness measurement. Fig. 8 shows an interior view of the lower casing section containing the window 39 and portions of the light cell 38. The window has closely spaced louvers at right angles to each other, indicated by cross-sectional lines in Fig. 8, for the purpose of requiring the light which enters through the window to do so from a direction essentially perpendicular to the face of the window. This facilitates correct brightness measurements from selected directions without the use of a projecting directional hood. Such a window may be made up of two 0.044 inch thicknesses of Louverplas sold by Ivan T. Johnson Company. The louvers are spaced 0.033 inch apart and are approximately four mils thick and perpendicular to the surface of the transparent plastic in which contained. The louvers in one sheet or thickness of the material run in one direction and those in the other sheet at right angles to such direction to form the directional light window used.

The light cell 38 is placed directly back of and flat against the window with its light sensitive surface exposed thereto. The cell is held in place in the bottom of the casing by clips 40 and forms a base for an electrical measuring instrument partially shown in Fig. 4 having a stationary permanent magnet field 40' and a moving armature coil 41 pivoted about a magnetic core 42 contained in a gap in the permanent magnet circuit. In order not to shunt flux from the permanent magnet no magnetic material is used in the cell structure. The cell 38 and magnet 40' are placed flatly against each other back to back. The axis of rotation of the armature is perpendicular to the light cell. To allow room for the lower pivot and lead-in spiral of the armature below the level of the permanent magnet, an opening 43 therefor is provided in the cell and also in the inner section of window 39. The lower extremity of the armature coil and its pivot and spiral are contained in such opening. This construction is for the purpose of keeping the complete device as thin as practicable. The instrument pivots are of the internal type and turn in jewels in the ends of the core 42. The core is secured in place by a strap 44 (see Figs. 3 and 5) fastened to its top end and extending radially therefrom to a bridging plate 61.

A zero adjustment for the instrument comprises a ring 46 (Fig. 4) fitting a counterbore in the inner periphery of the circular opening 43 in the photocell. The outer end of the lower spiral for the instrument is secured to ring 46 and the ring is rotatively adjustable in such opening. For this purpose a tab 47 rises from the ring. Such tab has a vertical slot therein for reception of an eccentric pin projecting from the end of a screw 48 extending through and rotatable in the side wall of the casing. The eccentric pin extends into the slot in tab 47 and when the screw is rotated, the zero position of the instrument pointer is adjusted. The lower lead-in spiral of the instrument is connected directly to one side of the light cell.

The measuring instrument is bolted to the light cell base by two bolts 49 and 50. One of these bolts 50 is insulated from the magnet structure and rear of the light cell and is also used as the other terminal between the light cell and upper lead-in spiral of the instrument. The inner thickness of the louvered window 39 has openings 51 and 52 opposite these bolts to make room for their heads on the window side of the cell and for making the electrical connection from the cell to the bolt 50.

In order to measure light values with acceptable accuracy over the entire range likely to be met with in practice, I provide two ranges of sensitivity for the electrical measuring instrument and two light value scales therefor, together with means for simultaneously changing from one condition of sensitivity and the scale corresponding thereto to the other condition of sensitivity and its corresponding scale. For the higher light value measurements I connect a resistance 53 in shunt to the armature coil 41, and for low light value measurements this shunt is opened by a switch 54 as represented in the circuit diagram portion of Fig. 5. The switch 54 is shown in the open position and is closed by sliding the movable switch contact 54 upwards. Contact 54 may be slid up and down by or with a crank arm 55 which turns with a shaft 56 extending from the interior to the exterior of the casing where it is provided with an operating tab 57 adapted to be moved between its two operating positions by the thumb of the user. This same crank arm 55, 56, 57 may be used to operate the scale changing mechanisms.

Two scales 7 and 8 are provided, one, 7, shown in Figs. 1, 2, and 3, reading from "0" to "20" for low values of light and the other, 8, shown in Fig. 4, reading from "0" to "2000" for high values of light. The shunt resistance 53 is of such a value that the value "20" on both scales corresponds to the same light value and with a corresponding change in instrument sensitivity. These scales are marked side by side on the slideable scale plate 58 in about the positions indicated in Fig. 5 by reference characters 7 and 8. The low light value scale 7 is exposed through the window openings 5, when scale plate 58 is up and switch 54 down and open, and the high light value scale 8 is exposed through the window opening 5 when the plate 58 is down and switch 54 up and closed. Scale plate 58 slides vertically on stationary guide pins 59 contained in vertical slots in such plate. These rods are supported between and also space stationary supporting plates 60 and 61, the plate 61 comprising the bridge plate of the measuring instrument previously mentioned. Plate 60 contains a window opening 5a in line with openings 5 but somewhat narrower in width. The sliding scale plate 58 is moved by means of a lever 62 pivoted to plate 61 at 63 and connected to crank arm 55 by the extension at 64. The shift of the scale plate from one position to the other is accompanied by a mild toggle snap action by reason of a spring 65 subject to compression between the effective operating end of lever 62 and a stationary point 66 positioned within the angle of throw of such lever end and more remote from the pivoted point 63 of such lever than the point of attachment of the spring to such lever. With such arrangement the spring 65 is under greatest compression when the lever 62 is near the midpoint of its extreme positions and hence snaps the lever from the dead-center position of the toggle to the extreme operating positions of the lever determined by the length of the slots in scale plate 58.

The spring 65 is unique in construction by reason of having one end doubled back towards its center and fastened at point 66 to the stationary supporting structure. This makes its effective useful length about twice as long as the distance between its points of support. This provides for greater uniformity of spring tension over the throw of the toggle than would be possible with a compression spring positioned entirely between the points of support. Also, at the same time the spring does not take up as much room as a spring of the same effective length supported at its opposite ends. The fork in the end of crank arm 55 engages fairly loosely with the extension 64 of the scale plate lever and with the eye in the upper end of switch member 54, so that the mechanism operates smoothly without binding and the toggle action gives the desirable amount of snap action and assures complete movements. The action is such as alternately to exactly center the two scales on plate 58 in the window openings provided. The central portion of the operating lever 62 also cooperates with the driving arms 33 and 34 of the calculator mechanism 32 on which the arms 26 and 27 are mounted and previously mentioned in connection with Fig. 2.

The electrical sensitivity and the scale changing mechanism of the light meter may be operated by the turning of calculator ring 2 through the lost-motion operating mechanism comprising pin 24 and mechanism 32 with its driving arms 26, 27, 33, and 34 operating on lever 62, as well as by means of the crank arm 55 and operating tab 57. The purpose of this arrangement is for the convenience of the user and for promoting correct and most accurate use of the combined instrument as will appear from the following. The mechanism as represented in Fig. 5 is adjusted for low values of light. That is, the electrical instrument is connected without the shunt for high sensitivity, the low value light scale 7 is exposed, and the calculator ring 2 is in a position to bring the low light value range of its light scale 12 opposite pointer index 13. Assume, for instance, that the apparatus has just been used for measuring a light value corresponding to the position of pointer 6 on scale 7 of "5," and that the calculator was set accordingly with the value "5" on scale 12 of ring 2 opposite index 13. Assume now that the light value increases to a value "50." Pointer 6 will move off the upper end of scale 7. The user may simply turn the ring 2 counterclockwise until pin 24 engages arm 26 and then slightly farther to change the sensitivity and light scales of the meter through the device 32 without touching tab 57. This change will occur at about the point where "50" on scale 12 passes index 13. As the change occurs, arm 26 moves counterclockwise out of the path of movement of pin 24 and arm 27 moves into such path behind or to the right of pin 24.

In the same way going from high light value and corresponding setting of the calculator to a low value, turning the calculator dial clockwise, pin 24 moves against arm 27 turning device 32 and, through arms 33 and 34, the lever 62 changing the light scales from high to low calibration and removing the shunt resistance 53 from across the instrument armature. As this change occurs, arm 27 moves out of the path of movement of pin 24 and lets the pin pass by and arm 26 moves into such path to the left of such pin. Simultaneously the low light values on the calculator scale 12 are brought adjacent the index 13. It is thus seen that the instrument calibration including its sensitivity and scale values may be changed by adjustment of the calculator light scale through the lost-motion driving means described in a manner to assure that the correct instrument calibration will be used for accurate and convenient settings of the calculator. There is a relatively small but desirable overlapping range on the calculator light scale that may be used with either instrument calibration. For instance, the light values from "40" to "50" may be brought into reading position with either instrument calibration. It is understood that the parts represented in Fig. 5 are greatly expanded in an axial direction, and that the front wall 29 of the casing in which part 32 is pivoted is not shown in this figure.

The instrument pointer 6 swings between the front wall of the casing and the supporting plate 60 of the scale changing structure where it may be observed through the window openings against the instrument scale in use as a background. The plates 60 and 61 which support the scale changing mechanism and switch are riveted together in spaced relation and mounted on and secured to the front wall of the permanent magnet 40' by the same bolts 49 and 50 that secure the magnet to the light sensitive cell structure. The bolt holes for this purpose in plate 61 are indicated in Fig. 5 at 49a and 50a. The tab 44 which supports the core of the instrument is an integral extension of plate 61. The stationary switch contact 54a is mounted on a sheet of insulation 67 (see Figs. 3 and 4) clamped between the right-hand pole of magnet 40 and plate 61. When the front section of the instrument casing is removed and the two clips 40 are removed, the electrical measuring instrument together with the light sensitive cell scale changing unit and switch may be lifted out of the back section of the instrument as a unit.

The light meter is preferably provided with a releasable pointer stop which prevents movement of the pointer except when released. This prevents movement of the pivoted armature and hence relieves the pivots of some wear and shock when the device is being carried about in a pocket or is not otherwise in use. It also permits the user to take a light measurement and preserve the reading as long as he wishes. This pointer lock may comprise a light spring frame part 68 shown in Fig. 5 secured to the front of plate 60 by the lower studs 59 and extending around the window area with the crossbar portion of such frame sprung away from the plate 60 to rest lightly against the under side of pointer 6 in any position of its deflection. The spring frame 68 may be flexed toward plate 60 and away from the pointer by a push rod 69 extending through the calculator plates 1 and 20 and the top wall 29 of the casing and accessible from the front of the device. The push rod extends through the central opening in the calculator rings 2 and 3 and hence does not intefere with their operation. It is just outside the arc of swing of the outer end of the pointer 6 and hence does not interfere therewith. The rod 69 may be held in place by screw-theading its inner end into spring frame 68. Hence the spring frame itself normally holds the push rod as well as the crossbar of such frame in pointer locking position. When a light measurement is to be taken, the back window of the device is directed in the light measurement direction and the push rod 69 shoved in by the thumb or finger. This releases the pointer which then deflects to the proper measurement position after which the push rod 69 is released and the pointer becomes locked in the measurement position and may be read at leisure. Also this is of considerable convenience in that the position of the meter may be shifted between a light measurement and the reading of the measurement. In any case where the calculator is to be removed from the casing, the push rod 69 may be unscrewed from spring frame 68 and pulled out to the front. If, then, the meter is to be used with the calculator removed, the push rod is again inserted through the opening provided therefor in the front wall of casing part 29 and screwed into the spring frame 68. In this case a somewhat shorter rod may be substituted if desired. The removal of the push rod for such assembly or disassembly operation is necessary only in case its outer end is provided with a knob larger than the openings through which the rod passes.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An exposure calculator comprising an outer ring having light value and exposure time scales, an inner ring having film speed and stop scales, supporting structure for supporting said rings in concentric relatively rotatable adjustable relation with the film speed scale in correlating relation with the light value scale and the stop scale in correlating relation with the exposure time scale, stop means on said rings and supporting structure for limiting the adjustment of said rings to their intended rotary adjustment ranges, said inner ring having teeth cut into its inner periphery over a distance corresponding to its adjustment range, a spring pressed detent cooperating with such teeth for locking said inner ring against easy turning relative to said supporting structure, said detent being supported by said supporting structure and an operating handle extending from said detent and accessible for manual operation for releasing said detent from locking engagement with the teeth in said ring to permit the ring to be turned.

2. An exposure calculator comprising an outer ring having light value and exposure time scales about different portions thereof, an inner ring having film speed and stop scales about different portions thereof, supporting structure having front and rear plates secured together with the rings between them, said structure supporting said rings in concentric rotary relation with the light value and film speed scales in adjacent correlating relation and the exposure time and stop scales in adjacent correlating relation, the front plate of said supporting structure having scale masking portions so as to expose only one selected film speed adjacent a selected useful portion of the light value scale corresponding to the brightness range which can be usefully recorded by photography with ordinary photographic film of the selected film speed, and means on said masking plate for designating only that part of said selected useful portion of the light value scale which should be used with color film of the selected film speed.

ALLEN G. STIMSON.

REFERENCES CITED

The following references are of record in the file of this patent:

UNITED STATES PATENTS

| Number | Name | Date |
| --- | --- | --- |
| 2,219,300 | Edmunds | Oct. 29, 1940 |
| 2,394,835 | Arant | Feb. 12, 1946 |
| 2,421,504 | Hickok | June 3, 1947 |